US009351891B2

(12) United States Patent
Maurer et al.

(10) Patent No.: US 9,351,891 B2
(45) **Date of Patent: *May 31, 2016**

(54) STABILIZED RAISING WHEELCHAIR

(71) Applicant: Dane Technologies, Inc., Brooklyn Park, MN (US)

(72) Inventors: Balz Maurer, Brunegg (CH); Fabian Wolter, Oberrohrdorf (CH)

(73) Assignee: Dane Technologies, INC., Brooklyn Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,681

(22) Filed: Oct. 28, 2014

(65) Prior Publication Data

US 2015/0042077 A1 Feb. 12, 2015

Related U.S. Application Data

(63) Continuation of application No. 13/623,743, filed on Sep. 20, 2012, now Pat. No. 8,870,216.

(60) Provisional application No. 61/537,028, filed on Sep. 20, 2011.

(51) Int. Cl.
*B62B 5/00* (2006.01)
*A61G 5/14* (2006.01)
(Continued)

(52) U.S. Cl.
CPC .. *A61G 5/14* (2013.01); *A61G 5/08* (2013.01); *A61G 5/1067* (2013.01); *A61G 2005/1081* (2013.01)

(58) Field of Classification Search
CPC .............. B62B 5/00; B62B 7/00; A61G 5/08; A61G 5/10; A61G 5/14
USPC ............ 280/657, 304.1, 250.1, 647, 642, 648
See application file for complete search history.

(56) References Cited

U.S. PATENT DOCUMENTS 4,067,249 A 1/1978 Deucher
4,076,304 A 2/1978 Deucher
(Continued)

FOREIGN PATENT DOCUMENTS

DE 102005038030 A1 2/2007
DE 202007018454 U1 9/2008
(Continued)

OTHER PUBLICATIONS

U.S. Appl. No. 13/623,743, Final Office Action mailed Mar. 7, 2014, 9 pgs.

(Continued)

*Primary Examiner* — Hau Phan
(74) *Attorney, Agent, or Firm* — Davis, Brown, Koehn, Shors & Roberts, P.C.; Sean D. Solberg

(57) ABSTRACT

A raising wheelchair comprises a wheeled frame and a raising system mounted to the frame and supporting a seat and a backrest. The raising system is configured to be movable between a lowered position and a raised position. The raising system includes at least one double-armed lever including a first lever member and a second lever member, a coupling member fixedly mounted to the frame, wherein the first lever member and the second lever member are pivotally coupled to the coupling member, and a coupling mechanism translationally coupled or pivotally coupled to a second end of the first lever member, pivotally coupled to a second end of the second lever member, and coupled to the backrest. The raising system maintains an orientation of the backrest relative to the ground that is substantially constant throughout substantially an entire range of movement between the lowered position and the raised position.

20 Claims, 9 Drawing Sheets

(51) Int. Cl.
*A61G 5/10* (2006.01)
*A61G 5/08* (2006.01)

(56) References Cited

U.S. PATENT DOCUMENTS

| | | | | |
|---|---|---|---|---|
| 4,462,604 | A | 7/1984 | Meyer | |
| 4,519,649 | A | 5/1985 | Tanaka et al. | |
| 4,592,570 | A | 6/1986 | Nassiri | |
| 4,598,944 | A | 7/1986 | Meyer et al. | |
| 4,679,816 | A | 7/1987 | Riikonen | |
| 5,096,008 | A * | 3/1992 | Mankowski | 180/6.5 |
| 5,328,247 | A | 7/1994 | Lovins | |
| 5,346,280 | A | 9/1994 | Deumite | |
| 5,356,172 | A | 10/1994 | Levy et al. | |
| 5,366,036 | A * | 11/1994 | Perry | 280/657 |
| 5,984,338 | A | 11/1999 | Meyer | |
| 6,601,869 | B2 | 8/2003 | Porcheron | |
| 6,976,698 | B2 * | 12/2005 | Kuiken | 280/647 |
| 7,077,416 | B2 * | 7/2006 | Duarte | 280/304.1 |
| 7,097,189 | B2 | 8/2006 | Hsu | |
| 7,708,093 | B1 * | 5/2010 | Baker | 180/65.1 |
| 7,784,815 | B2 | 8/2010 | Porcheron | |
| 7,815,209 | B2 | 10/2010 | Porcheron | |
| 7,845,665 | B2 | 12/2010 | Borisoff | |
| 8,403,352 | B2 * | 3/2013 | Hunziker | 280/304.1 |
| 8,870,216 | B2 * | 10/2014 | Maurer et al. | 280/657 |
| 2005/0006878 | A1 | 1/2005 | Laffin | |
| 2005/0040688 | A1 | 2/2005 | Laffin | |
| 2007/0296177 | A1 | 12/2007 | Porcheron | |
| 2010/0207353 | A1 * | 8/2010 | Hsu | 280/304.1 |
| 2011/0215540 | A1 * | 9/2011 | Hunziker et al. | 280/5.2 |
| 2013/0257020 | A1 | 10/2013 | Maurer et al. | |

FOREIGN PATENT DOCUMENTS

| | | | |
|---|---|---|---|
| EP | 0065129 | A2 | 4/1982 |
| EP | 0159562 | A2 | 10/1985 |
| EP | 0463652 | A1 | 5/1991 |
| FR | 2697418 | A1 | 5/1994 |
| WO | WO-7900647 | A1 | 9/1979 |
| WO | WO-03026549 | A1 | 4/2003 |
| WO | WO-2013041972 | A2 | 3/2013 |
| WO | WO-2013041972 | A3 | 3/2013 |
| WO | WO-2013041972 | A9 | 3/2013 |

OTHER PUBLICATIONS

U.S. Appl. No. 13/623,743, Non Final Office Action mailed Oct. 17, 2013, 9 pgs.

U.S. Appl. No. 13/623,743, Notice of Allowance mailed Jun. 23, 2014, 5 pgs.

U.S. Appl. No. 13/623,743, Response filed Jan. 16, 2014 to Non Final Office Action mailed Oct. 17, 2013.

U.S. Appl. No. 13/623,743, Response filed Jun. 9, 2014 to Final Office Action mailed Mar. 7, 2014, 13 pgs.

International Application Serial No. PCT/IB2012/002544, International Preliminary Report on Patentability mailed Apr. 3, 2014, 11 pgs.

International Application Serial No. PCT/IB2012/002544, International Search Report mailed Jul. 30, 2013, 7 pgs.

International Application Serial No. PCT/IB2012/002544, Invitation to Pay Additional Fees and Partial Search Report mailed Jan. 3, 2013, 5 pgs.

International Application Serial No. PCT/IB2012/002544, Invitation to Pay Additional Fees and Partial Search Report mailed Feb. 21, 2013, 31 pgs.

International Application Serial No. PCT/IB2012/002544, Written Opinion mailed Jul. 30, 2013, 9 pgs.

* cited by examiner

STABILIZED RAISING WHEELCHAIR

CROSS-REFERENCE TO RELATED APPLICATIONS

This patent application is a continuation of U.S. patent application Ser. No. 13/623,743 filed on Sep. 20, 2012, now Issued as U.S. Pat. No. 8,870,216, which claims the benefit of priority, under 35 U.S.C. §119(e), to U.S. Provisional Patent Application Ser. No. 61/537,028, entitled "STABILIZED RAISING WHEELCHAIR," filed on Sep. 20, 2011, which are herein incorporated by reference in their entirety.

BACKGROUND

Wheelchairs are frequently used to provide mobility for a person who has a limited ability to walk either temporarily or permanently. So called "raising wheelchairs" or "standing wheelchairs" can include a mechanism that moves the seat, the backrest, or both from a seated position to an upright position. The mechanism can assist in lifting or in counteracting the weight of the user to assist the user in rising from a seated to an erect position.

SUMMARY

This disclosure describes a raising wheelchair, and more particularly a wheelchair having a wheeled frame and a raising system which includes a seat and a backrest. The raising system can raise the seat and backrest from a lowered position to a raised position while maintaining an orientation of the backrest relative to the frame that is substantially constant throughout an entire range of movement between the lowered position and the raised position.

In an example, a raising wheelchair comprises a wheeled frame and a raising system mounted to the frame and supporting a seat and a backrest. The raising system is configured to be movable between a lowered position and a raised position. The raising system includes at least one double-armed lever including a first lever member and a second lever member, a coupling member fixedly mounted to the frame, wherein the first lever member and the second lever member are pivotally coupled to the coupling member, and a coupling mechanism translationally coupled or pivotally coupled to a second end of the first lever member, pivotally coupled to a second end of the second lever member, and coupled to the backrest. The raising system maintains an orientation of the backrest relative to the ground that is substantially consistent substantially throughout an entire range of movement between the lowered position and the raised position.

In another example, a raising wheelchair comprises a wheeled frame and a raising system mounted to the frame and supporting a seat and a backrest. The raising system is configured to be movable between a lowered position and a raised position. The raising system includes at least one double-armed lever including a first lever member and a second lever member, a coupling member fixedly mounted to the frame, wherein the first lever member is pivotally coupled to the coupling member at a first location on the coupling member and the second lever member is pivotally coupled to the coupling member at a second location on the coupling member, and a coupling mechanism translationally coupled to a second end of the first lever member, pivotally coupled to a second end of the second lever member, and fixedly coupled to the backrest. The first lever member and the second lever member pivot with respect to the coupling member so that the first lever member maintains a substantially constant orientation with respect to the second lever member when the raising system is moved between the lowered position and the raised position. The raising system maintains an orientation of the backrest relative to the ground that is substantially consistent throughout an entire range of movement between the lowered position and the raised position.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

DETAILED DESCRIPTION

A raising wheelchair is disclosed, and more particularly, a wheelchair is disclosed that includes a frame and a raising system mounted to the frame that supports a seat and a backrest. The raising system can be configured to move between a lowered position, also referred to herein as a seated position, and a raised position, also referred to herein as a standing position, in order to raise the seat, the backrest, or both from the lowered position to the raised position. The raising system can also maintain a consistent orientation of the backrest relative to the frame throughout substantially the entire range of motion from the lowered positioned to the raised position. As the raising system moves from the lowered position to the raised position, and vice versa, a user's torso can be kept in a consistent orientation throughout substantially the entire range of motion between the lowered position and the raised position minimizing shear on the user. The raising system can include a double-armed lever that moves to raise the seat or the backrest, or both, from the lowered position to the raised position while maintaining an orientation of the backrest relative to the ground that is substantially constant throughout substantially the entire range of motion.

Figure 1:
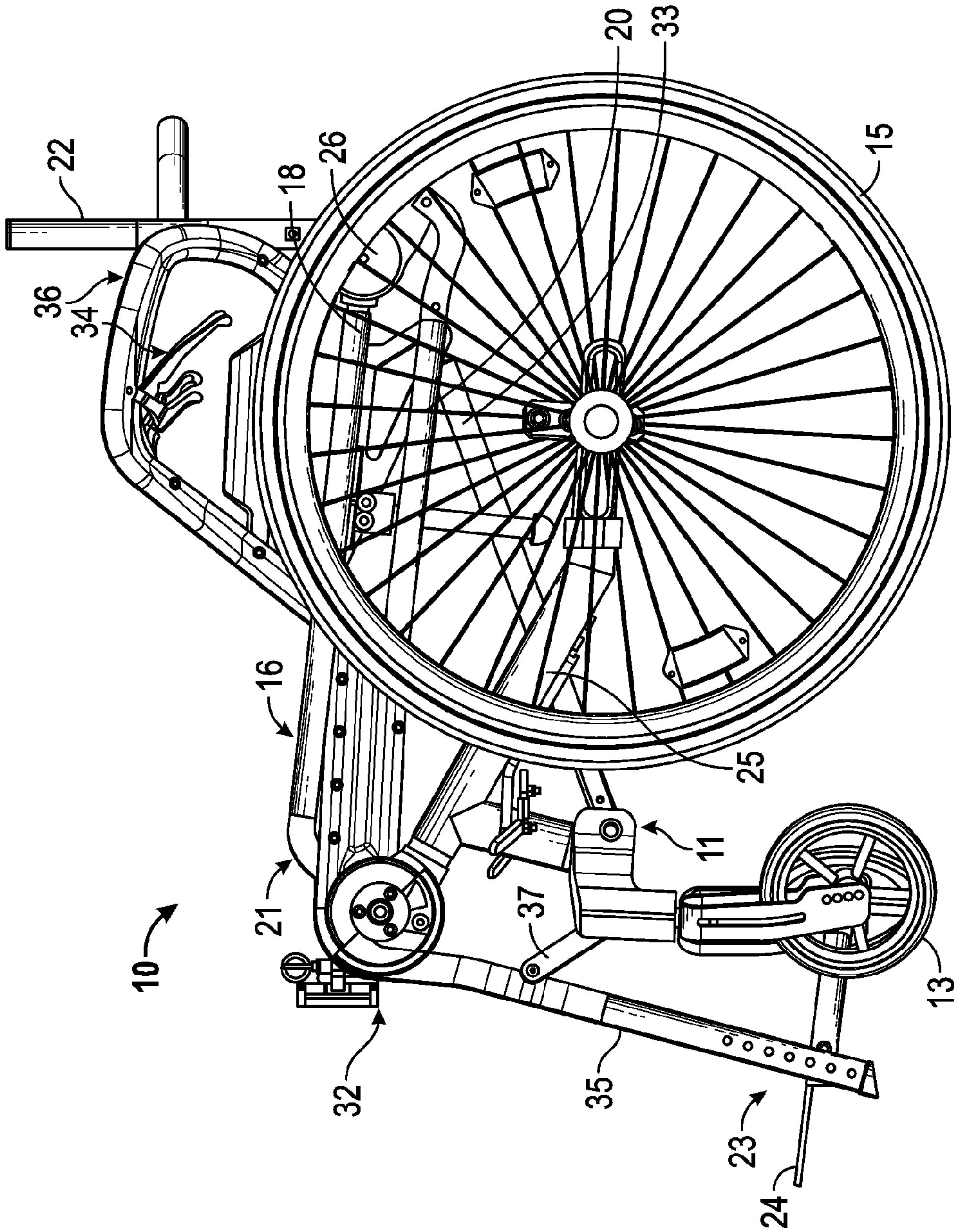
FIG. 1 is a side view of an example of a raising-type wheelchair in a lowered or seated position.
Figure 2:
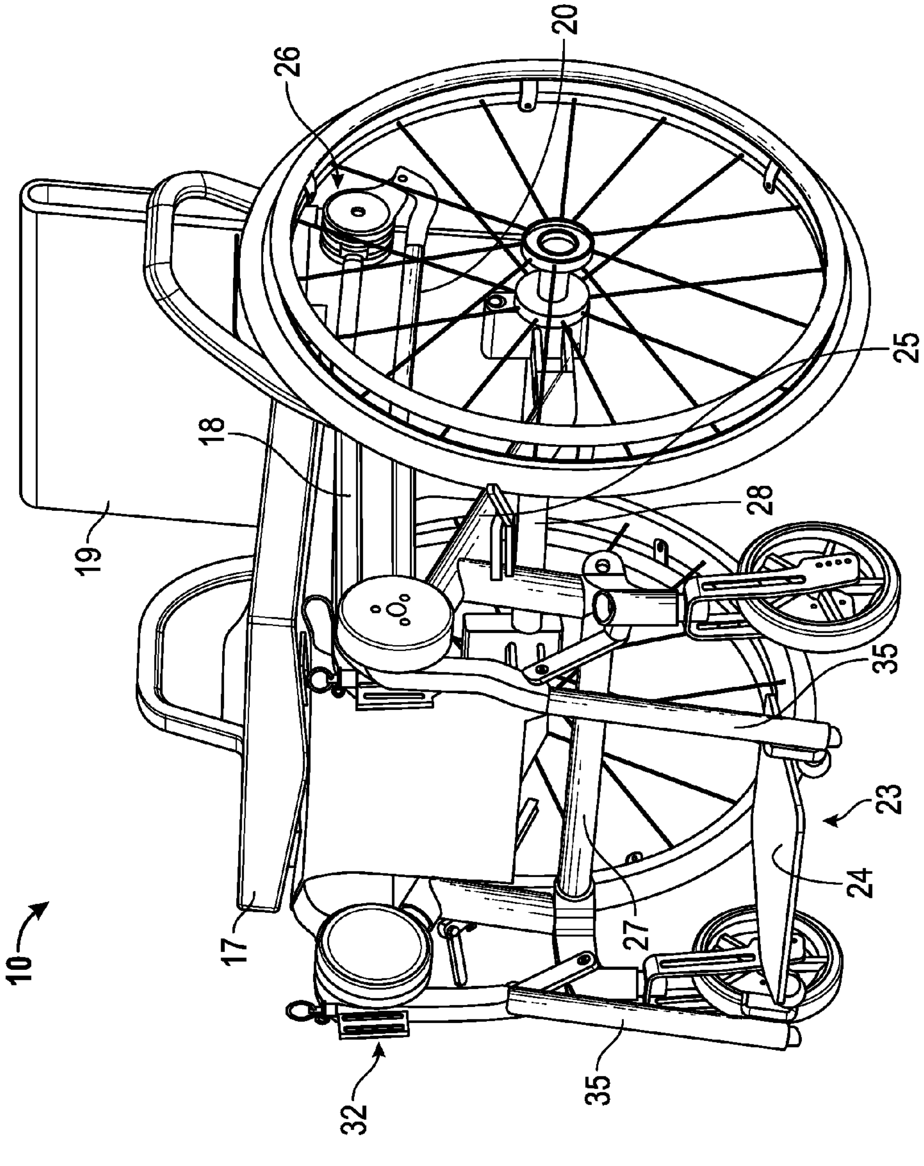
FIG. 2 is a front perspective view of the example wheelchair of FIG. 1.

FIGS. 1 and 2 show an example of a raising-type wheelchair 10 in a lowered position. The wheelchair 10 can include a wheeled frame 11 with a pair of front wheels 13, a pair of main or rear wheels 15, and a footrest 23 with a foot support surface 24 each mounted to the frame 11. The wheelchair 10 can further include a seat 17 and a backrest 19 that are supported by a raising system 21 mounted to the frame 11. The raising system 21 can include a double armed lever 16 that is pivotally coupled to the frame 11 and that can effectuate the lifting of the seat 17 and the backrest 19 between the lowered position and the raised position. The seat 17 can be supported by the first lever member 18, and the backrest 19 can be supported by a backrest support 22. The wheelchair 10 can include a suspension system for isolating a user from vibration transmitted from the surface being crossed (e.g., the ground) through the frame 11.

As will be discussed in further detail below, the double armed lever 16 can include a first lever member 18 and a second lever member 20 that together from a generally-parallelogram shape. The double-armed lever 16 can be configured to maintain the generally-parallelogram shape during substantially the entire range of movement between the lowered position and the raised position, and vice versa.

The wheeled frame 11 can be of tubular construction formed by two side frames 25 coupled together by cross members 27 and 28, as best illustrated in FIG. 2. The wheeled frame 11 can therefore form a stable structure for a user. The exemplary raising system 21 can be pivotally coupled to the wheeled frame 11 at a front end 32 of the wheelchair 10. The raising system 21 can support the seat 17 and the backrest 19 and be constructed such that the backrest 19 has approximately the same vertical orientation regardless of the orientation of the seat 17. This can, for example, allow the vertical orientation of the backrest 19 to remain substantially unchanged regardless of the position of the raising system 21 when the user moves the wheelchair from a seated position to a standing position.

Although the vertical orientation of the backrest 19 in the example embodiment can remain substantially unchanged during the range of motion between the lowered, seated position and the raised, standing position, and vice versa, the angle of the backrest 19 relative to the seat 17 can be adjusted for comfort of the user while in the seated or standing position. Therefore, in an example, the wheelchair 10 can include a backrest adjustment mechanism 26 for adjusting the angle of the backrest 19 relative to another component of the wheelchair 10, such as the seat 17, the first lever member 18, or the second lever member 20.

Figure 3A:
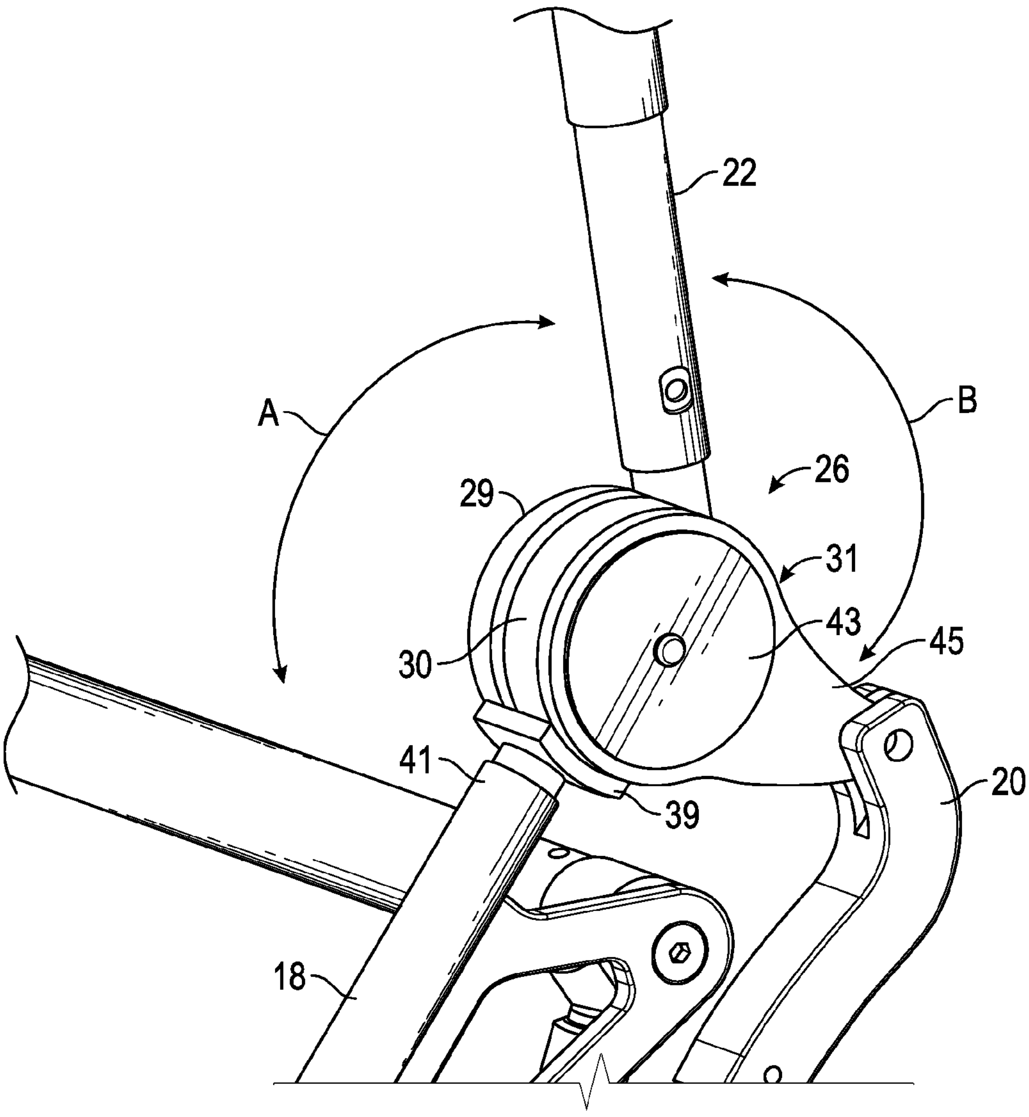
FIGS. 3A-3C illustrate various components of a wheelchair backrest adjustment mechanism.
Figure 3B:
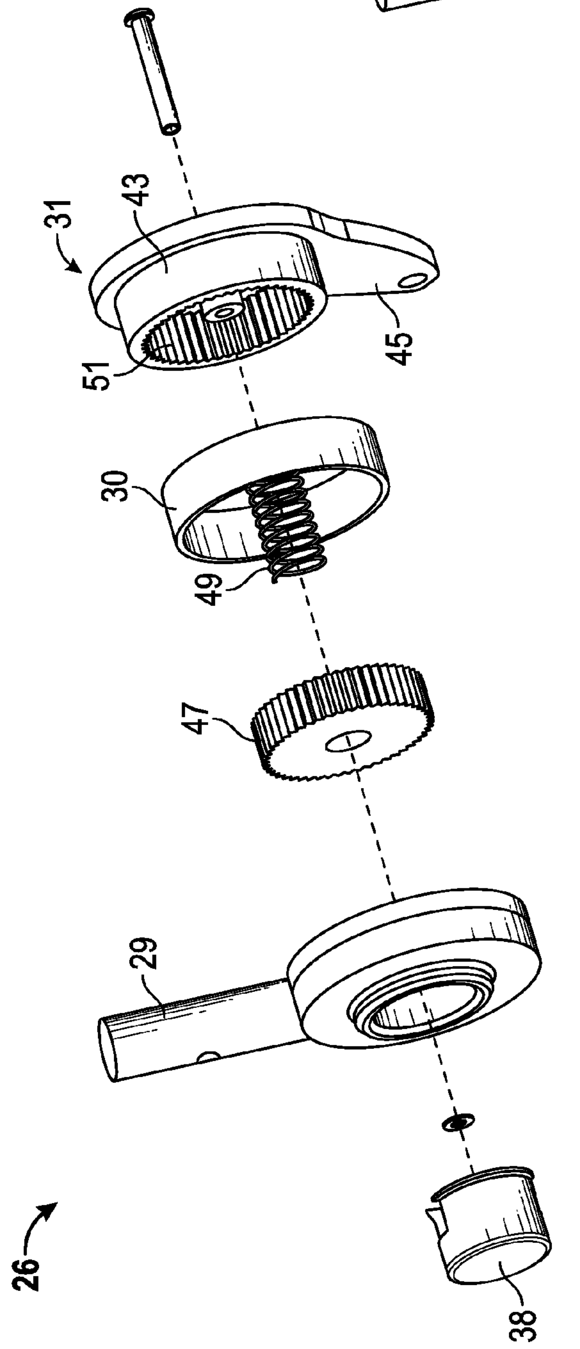
Figure 3C:
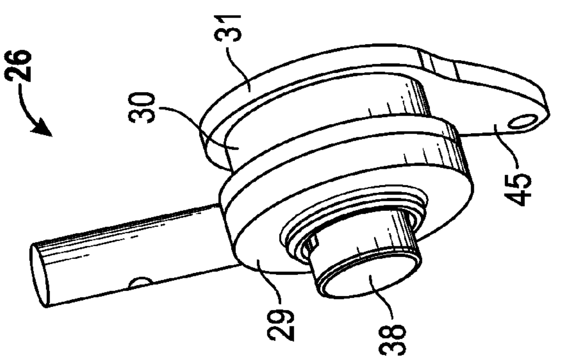

FIGS. 3A-3C illustrate various components of an example backrest adjustment mechanism 26. As shown in FIGS. 3A-3C, the backrest adjustment mechanism 26 can include a first component 29 for engaging the backrest support 22, a second component 30 for engaging the first lever member 18, and a third component 31 for engaging the second lever member 20. The first component 29 can be fixedly engaged with the backrest support 22 so that the first component 29 does not move relative to the backrest support 22 or the backrest 19. The second component 30 can be translationally engaged or pivotally coupled with the first lever member 18. The term "translationally engaged," as it is use herein, can refer to the first lever member 18 being configured to slide along a side or edge of the second component 30. For example, the second component 30 can comprise a generally ring-shaped or disk-shaped member (best seen in FIG. 3B), and an engaging member 39 mounted to an upper end 41 of the first lever member 18 can slide along the outer perimeter of the ring-shaped or disk-shaped member of the second component 30 without becoming disengaged from the second component 30. The third component 31 can be pivotally coupled to the second lever member 20. In an example, the third component 31 can include a main portion 43, such as the generally disk-shaped main portion 43 best shown in FIG. 3A, and a tab 45 that extends outward from the main portion 43. The tab 45 can provide for an angle B between the backrest support 22 and the tab 45 that can be adjusted by the backrest adjustment mechanism 26, as described below.

The backrest adjustment mechanism 26 can interconnect various components of the raising system 21, such as the first lever member 18 (which supports the seat 17), the second lever member 20, and the backrest support 22 (which supports the backrest 19). The backrest adjustment mechanism 26 can be configured so that the geometry of the backrest support 22, and thus the backrest 19, relative to one or more other components of the wheelchair 10 (such as the seat 17, the first lever member 18, or the second lever member 20) can be adjusted. In an example, the backrest adjustment mechanism 26 includes an adjustment knob 38 (FIG. 3B) that can provide for adjustment of an orientation of the first component 29 relative to one or both of the second component 30 and the third component 31. The knob 38 can therefore allow the user to control the orientation of the backrest 19 relative to one or more of the seat 17, the first lever member 18, and the second lever member 20.

In an example, shown in FIG. 3B, the backrest adjustment mechanism 29 can include a gear 47 that can engage one or more of the components 29, 30, 31 and a spring 49 that can bias the gear 47 into a first position. The spring 49 can also bias the adjustment knob 38 into an outward position. When the gear 47 is in the first position, it can engage a set of teeth 51 within the third component 31 and a similar set of teeth in the interior of the first component 29 (not shown) so that the first component 29 and the third component 31 are unable to move relative to one another. When the adjustment knob 38 is pushed inward (e.g., from the left toward the right in FIG. 3B) by a user, the knob 38 pushes the gear 47 into a second position, which in turn can compress the spring 49. The gear 47 can be pushed completely into the interior of the third component 31 so that the gear 47 only engages the teeth 51 of the third component 31 and does not engage the teeth of the first component 29. This can allow the first component 29 to rotate or pivot relative to the third component 31 so that the angle B between the backrest support 22 and the tab 45 of the third component 31 can be adjusted. After the knob 38 is released by the user, the spring 49 can again bias the gear 47 back into the first position so that the gear 47 engages both the teeth 51 of the third component 31 and the teeth of the first component 29 such that the first component 29 and the third component 31 are locked with respect to one another.

Figure 4:
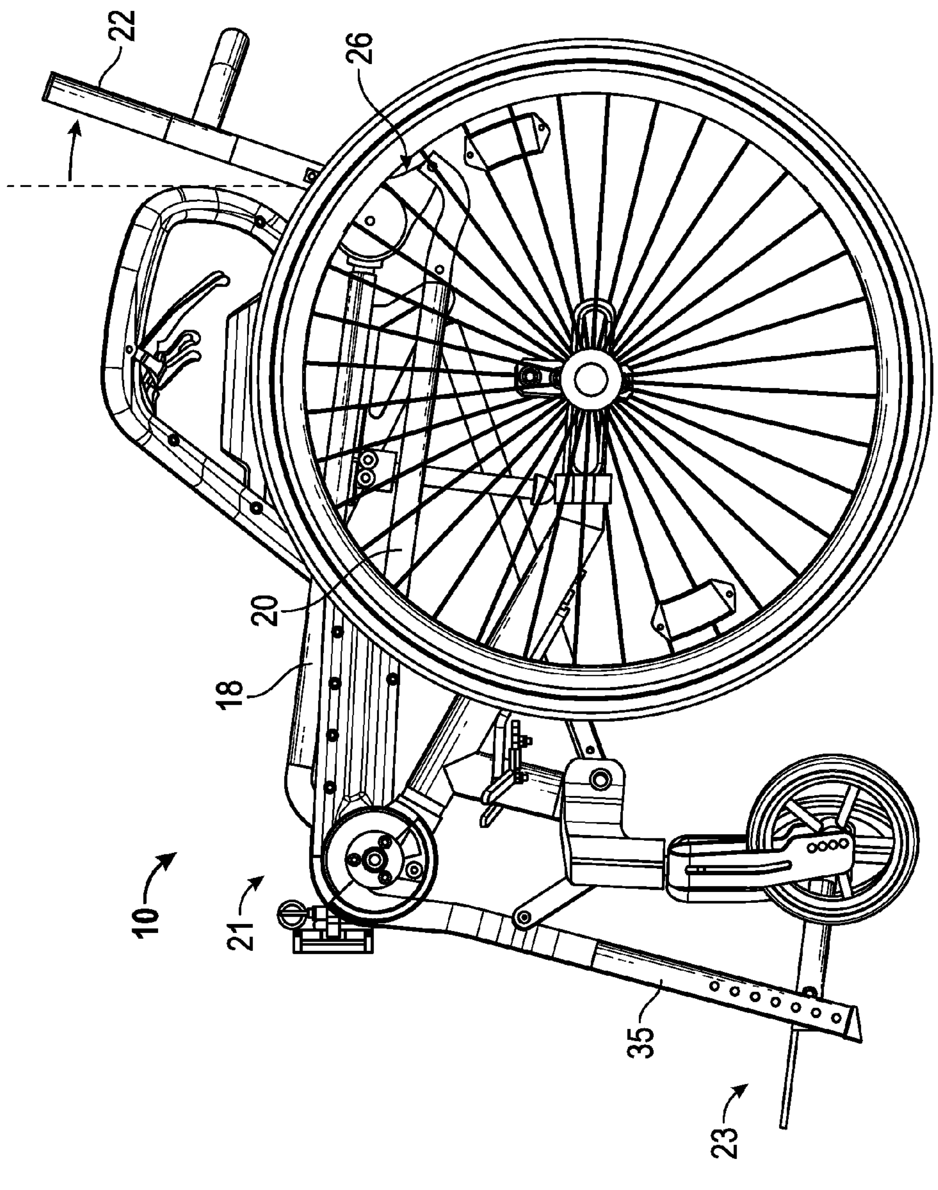
FIG. 4 is a side view of the wheelchair of FIG. 1 illustrating operation of the backrest adjustment mechanism.

The backrest adjustment mechanism 26 can allow a user to adjust the angle A between the backrest support 22 (and backrest 19) and the first lever member 18 (and seat 17) in accordance with the preference of the user. FIG. 4 is a side view of the wheelchair 10 illustrating movement of the backrest 19 from a first position that is more upright (shown as the broken line in FIG. 4) to a second, more reclined position.

Figure 5:
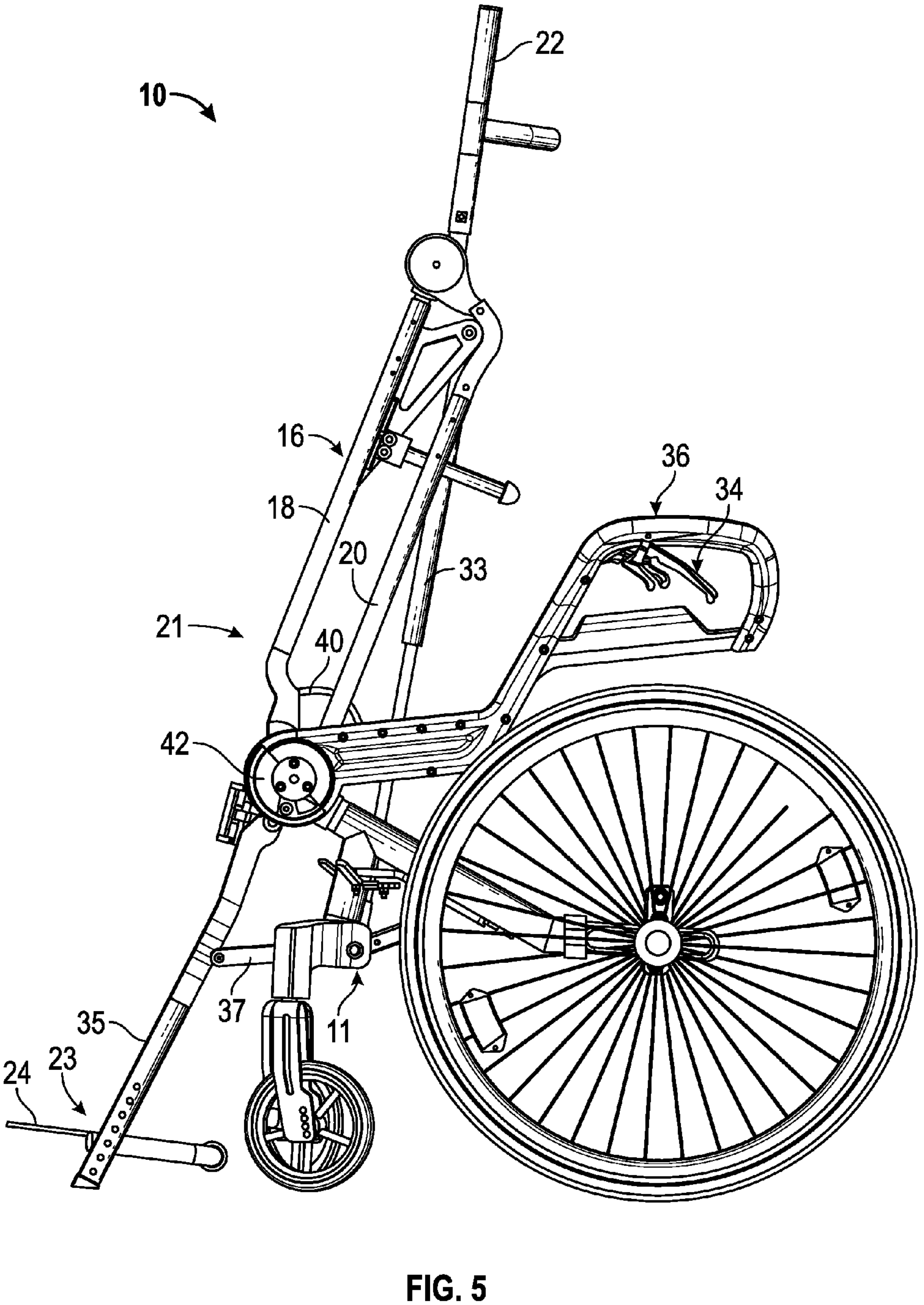
FIG. 5 is a side view of the wheelchair of FIGS. 1 and 4 moved to a raised position or standing position.

FIG. 5 is a side view of the wheelchair 10 of FIG. 4 moved to a raised position. For purposes of illustration, the seat 17 and the backrest 19 have been removed from FIG. 5 so that other components of the wheelchair 10 can be more easily viewed. Raising of the wheelchair 10 from a seated position, as shown in FIG. 4, to a raised or standing position, as shown in FIG. 5, can incorporate the use of at least one gas spring 33 or the like to bias the raising system 21, the seat 17, and the backrest 19 toward the raised position. Additionally, the raising system 21 can include control elements, such as control levers 34, for releasing and blocking the gas spring 33 to control raising and lowering of the seat 17 and backrest 19. Suitable hand holds 36 can also be provided to assist the user with raising or lowering himself or herself when moving between the sitting and the standing position.

In an alternate example, one or more of the gas spring 33 and the control levers 34 can be replaced with suitable electric motor or motors or other lifting mechanism to provide an assisted or power-assisted (as opposed to manual) means for raising and lowering the position of the chair.

The footrest 23 can further include, at both sides, a leg member 35 extending upward toward the raising system 21.

The leg members 35 can each be pivotally coupled to the wheeled frame 11 with a coupling element 37 in such a manner that, upon raising movement of the chair to the position of FIG. 5, the footrest 23 is moved forward and downward until contact is made with the ground.

Figure 6:
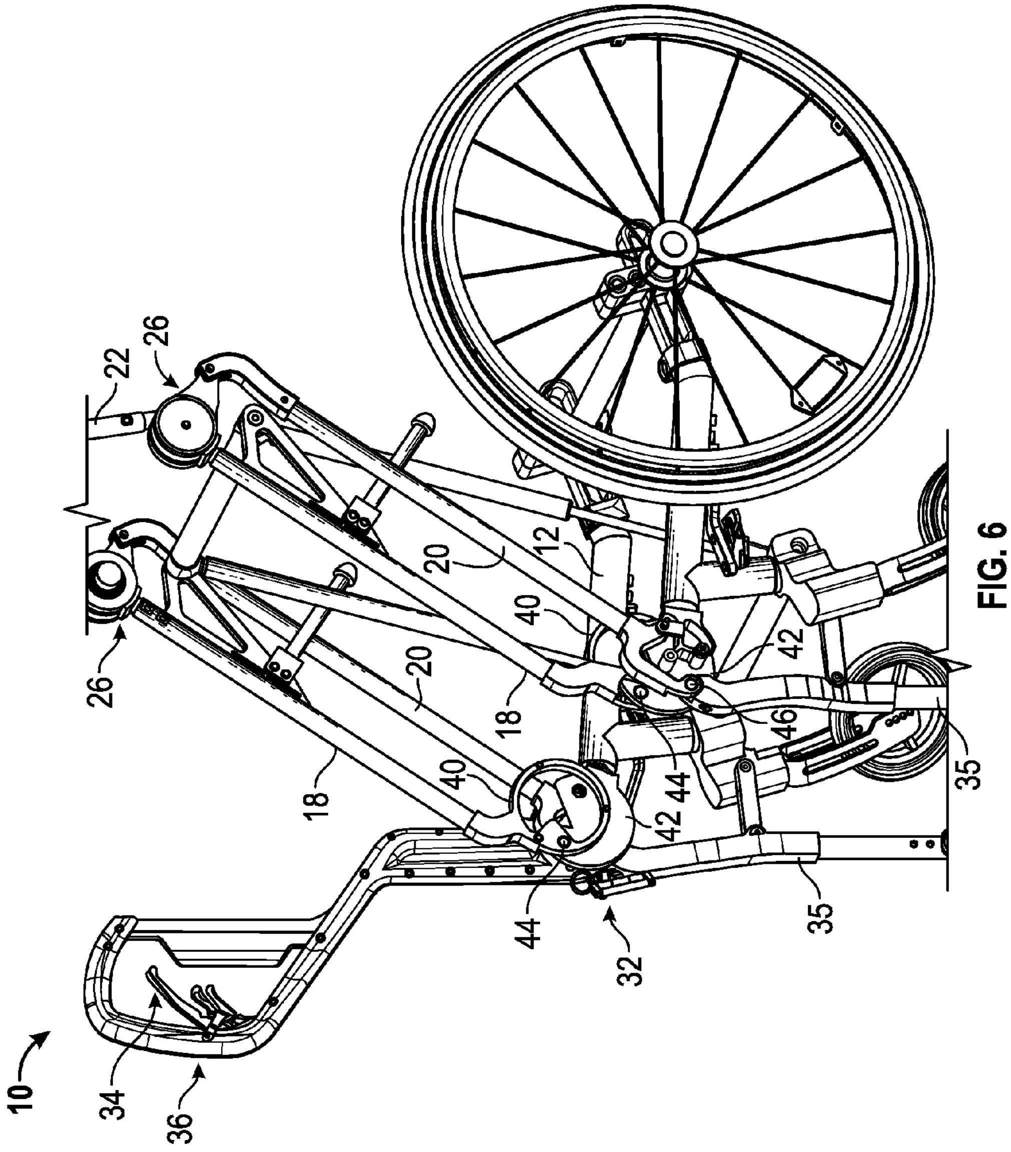
FIGS. 6-8 illustrate various structural components of the wheelchair that allow a seat backrest to maintain a substantially constant vertical position as the wheelchair moves between a seated position and a raised position.
Figure 7:
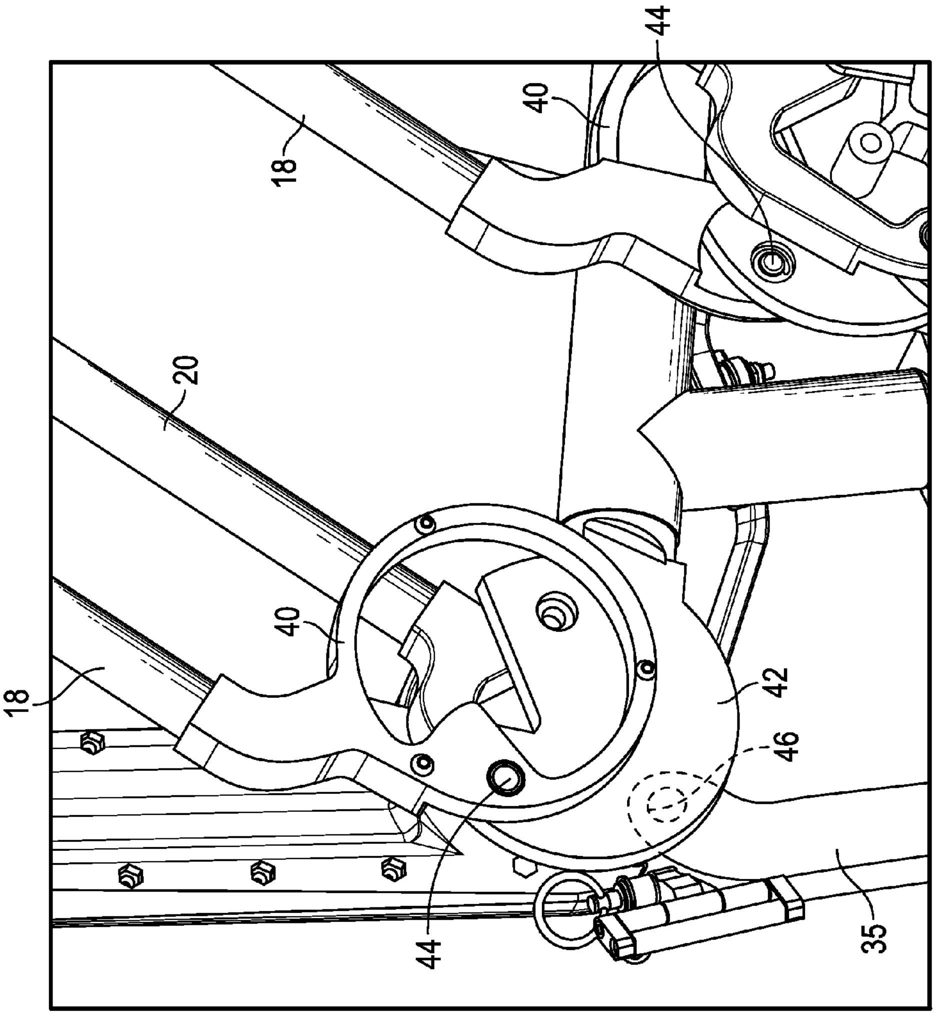
Figure 8:
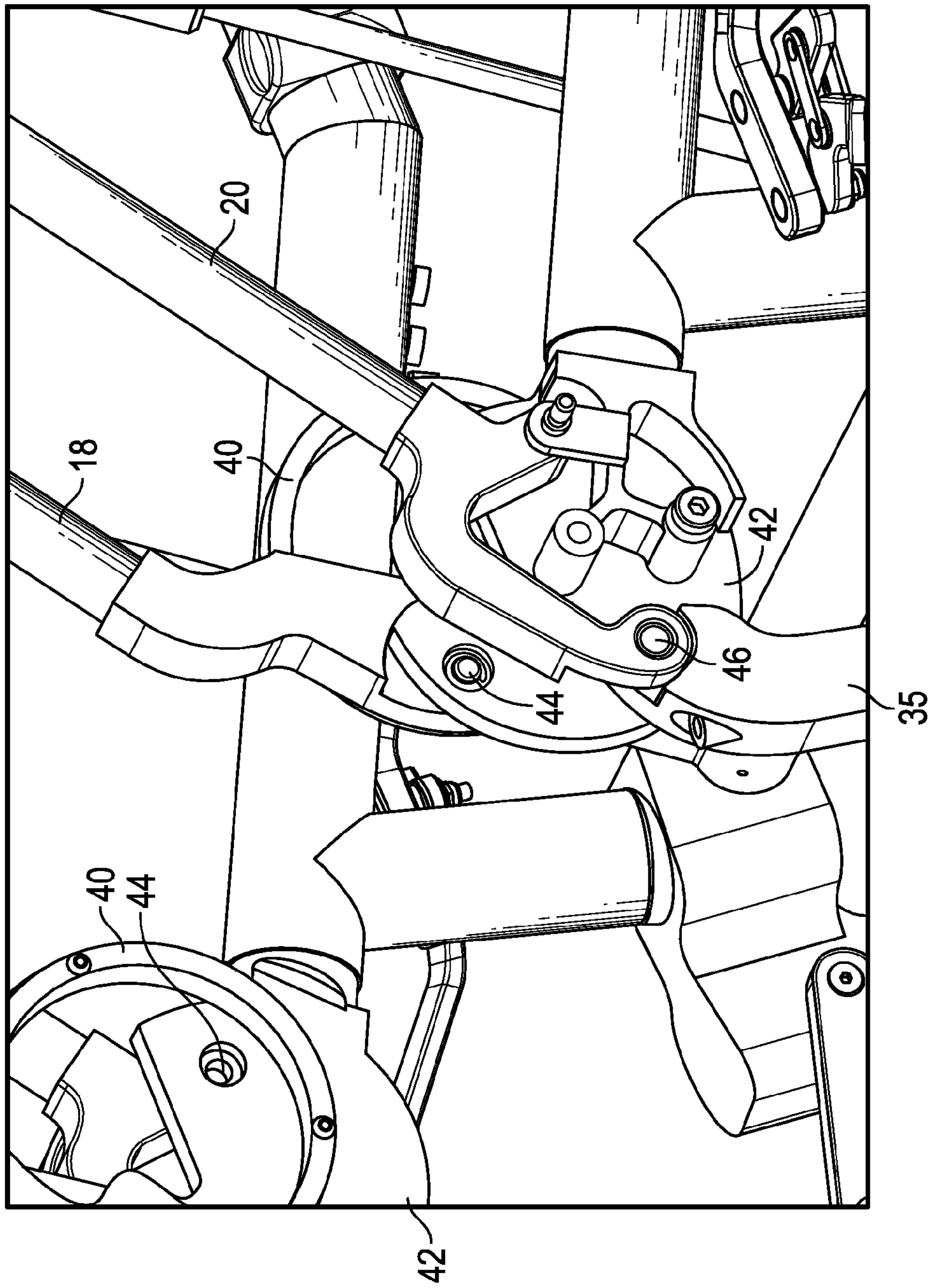

As mentioned above and depicted in FIGS. 4 and 5, the parallelogram shape of the double armed lever 16 can be maintained during movement between the seated wheelchair position and the standing wheelchair position. Maintaining the parallelogram configuration of the double armed lever 16 can allow the backrest support 22 (and backrest 19) to maintain a substantially consistent vertical orientation throughout substantially the entire range of movement. FIGS. 6-8 illustrate various components of the wheelchair 10 that can provide for maintaining the generally parallelogram shape of the double armed lever 16 during the range of movement between the lowered position and the raised position, and vice versa.

FIG. 6 is a perspective view illustrating the wheelchair 10 in a position about midway between the seated position (FIG. 4) and the raised position (FIG. 5). As illustrated in FIG. 6 and the enlarged perspective views of FIGS. 7 and 8, the first lever members 18 (one on each side) can be mounted to respective first coupling member 40, e.g., generally circular-shaped first coupling disks 40 shown in FIGS. 6-8, positioned adjacent to the upper ends of the leg members 35 of the footrest 23. A set of second coupling members 42, e.g., generally circular-shaped second coupling disks 42 shown in FIGS. 6-8, can be fixedly mounted to the frame 11, such as at the front end 32, so that the second coupling members 42 can remain in a fixed position while the raising system 21 moves from the seated position to the raised position. As further illustrated in FIGS. 6-8, the first coupling members 40 can be pivotally coupled to a respective second coupling member 42, such as with a suitable fastening means about pivot points 44. The second lever members 20 (one on each side) can also be pivotally coupled to the second coupling members 42, such as with a suitable fastening means about pivot points 46. The first pivot point 44 and the second pivot point 46 of a particular side can be located at different positions on the second coupling member 42. The upper ends of the leg members 35 can also be pivotally coupled to the second coupling members 42. In an example, both the second lever member 20 and the leg member 35 of a particular side can be pivotally coupled to the second coupling member 42 at the same pivot point 46 so that both pivot at the same point 46.

In the illustrated example, during movement of the wheelchair 10 from the seated position to the raised position, and vice versa, the second coupling members 42 can remain in a fixed position. The pivotal coupling between the first coupling members 40 and the second coupling members 42 can allow the double armed lever 16 to maintain the generally parallelogram shape formed between the first lever member 18 and the second lever member 20. This can allow the backrest support 22 and the backrest 17 to maintain a substantially constant vertical orientation relative to the frame 11 during substantially the entire range of motion between the seated position and the raised position. The movement or articulation between the first coupling disks 40 and the second coupling disks 42 can be seen by comparing their respective positions in the seated position of FIG. 4 and the raised position of FIG. 5.

The pivotal coupling between the second lever member 20 and the backrest adjustment mechanism 26 and the translational or pivotal coupling between the first lever member 18 and the backrest adjustment mechanism 26 can also allow the double armed lever 16 to maintain the generally parallelogram shape. For example, the second lever member 20 can pivot with respect to the third component 31 of the backrest adjustment mechanism 26, while the first lever member 18 can slide along the second component 30 or pivot with respect to the second component 30 as the wheelchair 10 moves from the seated position to the raised position, as described above. The pivoting of the second lever member 20 and the sliding or pivoting of the first lever member 18, combined with the pivoting of the lever members 18, 20 with respect to the coupling members 40, 42 (described above) can allow the double armed lever 16 to maintain the generally parallelogram shape in order to maintain a vertical orientation of the backrest support 22 and the backrest 19.

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A raising wheelchair comprising a wheeled frame and a raising system mounted to the frame and supporting a seat and a backrest, the raising system configured to be movable between a lowered position and a raised position, the raising system comprising:

a. at least one double-armed lever including a first lever member and a second lever member;

b. a coupling member fixedly mounted to the frame, wherein the first lever member and the second lever member are pivotally coupled to the coupling member; and c. a coupling mechanism translationally coupled or pivotally coupled to a second end of the first lever member, pivotally coupled to a second end of the second lever member, and coupled to the backrest, the coupling mechanism comprising:

i. a first component for coupling to the backrest;

ii. a second component for coupling to the first lever member;

iii. a third component for coupling to the second lever member; and iv. an adjustment mechanism comprising:

A. a gear that is movable between a first position and a second position;

B. a spring that biases the gear into the first position; and

C. a member for moving the gear from the first position to the second position, wherein the raising system maintains an orientation of the backrest relative to the ground that is substantially consistent throughout substantially an entire range of movement between the lowered position and the raised position, wherein the adjustment mechanism allows for adjusting an angle between the first component and at least one of the second component and the third component, and further wherein when in the first position, the gear engages both the first component and the at least one of the second component and the third component in a fixed orientation with respect to one another, and, when in the second position, the gear engages only one of the first component or the at least one of the second component and the third component so that the first component can move with respect to the at least one of the second component and the third component.

2. The raising wheelchair of claim 1, wherein the first lever member is pivotally coupled to the coupling member at a first location on the coupling member and the second lever member is pivotally coupled to the coupling member at a second location on the coupling member.

3. The raising wheelchair of claim 2, further comprising at least one footrest coupled to a first end of a leg support, wherein a second end of the leg support is pivotally coupled to the coupling member.

4. The raising wheelchair of claim 3, wherein the leg support is pivotally coupled at the second location on the coupling member.

5. The raising wheelchair of claim 1, wherein the first lever member and the second lever member pivot with respect to the coupling member so that the first lever member maintains a substantially constant orientation with respect to the second lever member when the raising system is moved between the lowered position and the raised position.

6. The raising wheelchair of claim 5, wherein the first lever member and a second lever member together form a generally-parallelogram shape, wherein the first lever member and the second lever member maintain the generally parallelogram shape during movement between the lowered position and the raised position.

7. The raising wheelchair of claim 1, wherein the coupling mechanism further comprises an backrest adjustment mechanism for adjusting an angle of the backrest relative to at least one of the seat, the first lever member, and the second lever member.

8. The raising wheelchair of claim 1, further comprising a raising mechanism for moving the raising system from the lowered position to the raised position.

9. The raising wheelchair of claim 8, further comprising one or more controls for operating the raising mechanism.

10. The raising wheelchair of claim 8, wherein the raising mechanism comprises at least one of a gas spring and a motor.

11. The raising wheelchair of claim 1, further comprising a suspension system for isolating a user from vibration transmitted from the surface being crossed through the frame.

12. A raising wheelchair comprising a wheeled frame and a raising system mounted to the frame and supporting a seat and a backrest, the raising system configured to be movable between a lowered position and a raised position, the raising system comprising:

a. at least one double-armed lever including a first lever member and a second lever member;

b. a coupling member fixedly mounted to the frame, wherein the first lever member is pivotally coupled to the coupling member at a first location on the coupling member and the second lever member is pivotally coupled to the coupling member at a second location on the coupling member; and c. a coupling mechanism translationally coupled to a second end of the first lever member, pivotally coupled to a second end of the second lever member, and coupled to the backrest, wherein, the first lever member and the second lever member pivot with respect to the coupling member so that the first lever member maintains a substantially constant orientation with respect to the second lever member when the raising system is moved between the lowered position and the raised position, and wherein the raising system maintains an orientation of the backrest relative to the ground that is substantially constant throughout an entire range of movement between the lowered position and the raised position; and d. an adjustment mechanism comprising:

i. a gear that is movable between a first position and a second position;

ii. a spring that biases the gear into the first position; and iii. a member for moving the gear from the first position to the second position, wherein the adjustment mechanism allows for adjusting an angle between the backrest support and the at least one double-armed lever, and wherein when in the first position, the gear operationally engages both the backrest and the at least one double-armed lever in a fixed orientation with respect to one another, and, when in the second position, the gear engages only one of the backrest or double-armed lever so that the backrest can move with respect to the double-armed lever.

13. A raising wheelchair comprising a wheeled frame and a raising system mounted to the wheeled frame and supporting a seat and a backrest support, the raising system configured to be movable between a lowered position and a raised position, the raising system comprising:

a. at least one double-armed lever;

b. a coupling member fixedly mounted to the frame, wherein the at least one double-armed lever is pivotally coupled to the coupling member; and c. a coupling mechanism translationally coupled or pivotally coupled to a second end of the at least one double-armed lever, and coupled to the backrest support, the coupling mechanism comprising an adjustment mechanism comprising:

i. a gear that is movable between a first position and a second position;

ii. a spring that biases the gear into the first position; and iii. a member for moving the gear from the first position to the second position, wherein the adjustment mechanism allows for adjusting an angle between the backrest support and the at least one double-armed lever, and further wherein when in the first position, the gear operationally engages both the backrest support and the at least one double-armed lever in a fixed orientation with respect to one another, and, when in the second position, the gear engages only one of the backrest support or double-armed lever so that the backrest support can move with respect to the double-armed lever.

14. The raising wheelchair of claim 13, further comprising at least one footrest coupled to a first end of a leg support, wherein a second end of the leg support is pivotally coupled to the coupling member.

15. The raising wheelchair of claim 13, further comprising one or more controls for operating the raising system.

16. The raising wheelchair of claim 13, wherein the raising system comprises at least one of a gas spring and a motor.

17. The raising wheelchair of claim 13, further comprising a suspension system for isolating a user from vibration transmitted from the surface being crossed through the wheeled frame.

18. The raising wheelchair of claim 13, wherein the at least one double-armed lever comprises:

a. a first lever member pivotally coupled to the coupling member at a first location on the coupling member; and b. a second lever member is pivotally coupled to the coupling member at a second location on the coupling member.

19. The raising wheelchair of claim 18, wherein the first lever member and the second lever member pivot with respect to the coupling member so that the first lever member maintains a substantially constant orientation with respect to the second lever member when the raising system is moved between the lowered position and the raised position.

20. The raising wheelchair of claim 18, wherein the first lever member and a second lever member together form a generally-parallelogram shape, wherein the first lever member and the second lever member maintain the generally parallelogram shape during movement between the lowered position and the raised position.

* * * * *